United States Patent [19]

Wren

[11] Patent Number: 4,764,008

[45] Date of Patent: Aug. 16, 1988

[54] SURVEILLANCE HOUSING ASSEMBLY

[76] Inventor: Clifford T. Wren, 2036 Honeysuckle La., Jefferson City, Mo. 65101

[21] Appl. No.: 122,935

[22] Filed: Nov. 19, 1987

[51] Int. Cl.[4] ........................ H04N 7/18; G03B 29/00

[52] U.S. Cl. ........................................ 354/81; 354/293; 352/242; 352/243; 358/108; 358/210; 358/229

[58] Field of Search .................. 354/81, 293; 352/242, 352/243; 358/108, 210, 229

[56] References Cited

U.S. PATENT DOCUMENTS

| | | | |
|---|---|---|---|
| D. 239,054 | 3/1976 | Pagano . | |
| D. 275,294 | 8/1984 | Pagano . | |
| 3,535,442 | 10/1970 | Jennings | 358/108 |
| 3,720,147 | 3/1973 | Bemis | 352/242 X |
| 3,732,368 | 5/1973 | Mahlab | 358/108 |
| 3,739,703 | 6/1973 | Behles | 354/81 |
| 3,916,097 | 10/1975 | Imai | 358/108 |
| 3,993,866 | 11/1976 | Pearl et al. | 354/81 X |
| 4,027,329 | 5/1977 | Coutta | 358/229 |
| 4,080,629 | 3/1978 | Glover et al. | 358/229 |
| 4,160,999 | 7/1979 | Claggett | 358/108 |
| 4,217,606 | 8/1980 | Nordmann | 352/242 |
| 4,320,949 | 3/1982 | Pagano | 354/81 |
| 4,337,482 | 6/1982 | Coutta | 358/210 X |

*Primary Examiner*—A. A. Mathews

*Attorney, Agent, or Firm*—Rogers, Howell, Moore & Haferkamp

[57] ABSTRACT

A novel and useful surveillance camera housing assembly is provided. The assembly is easily mounted as a sturdy arrangement as a rectangular section of a suspended ceiling. A pair of side supports of the assembly extend over the cross forming inverted T-shaped ceiling support members which define the rectangular section and rest on the outer edges of each of the inverted T-shaped ceiling supporting members. A bridge spans the side supports from which a surveillance camera mounting depends. A frame with radiating legs is attached to the camera mounting. An inner dome is attached to the frame in a quick detachable relationship. An outer dome with a rectangular base approximating the size of the rectangular section is provided along one edge with horizontally projecting ears for supporting the outer dome between two parallel disposed inverted T-shaped ceiling support members when the outerdome is pivotted downwardly about the horizontal axis of the ear bearing edges of the outer dome.

10 Claims, 2 Drawing Sheets

FIG. 6.
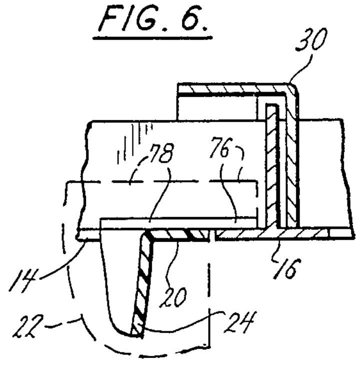
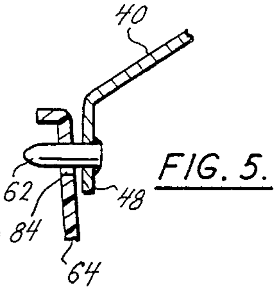
FIG. 5.
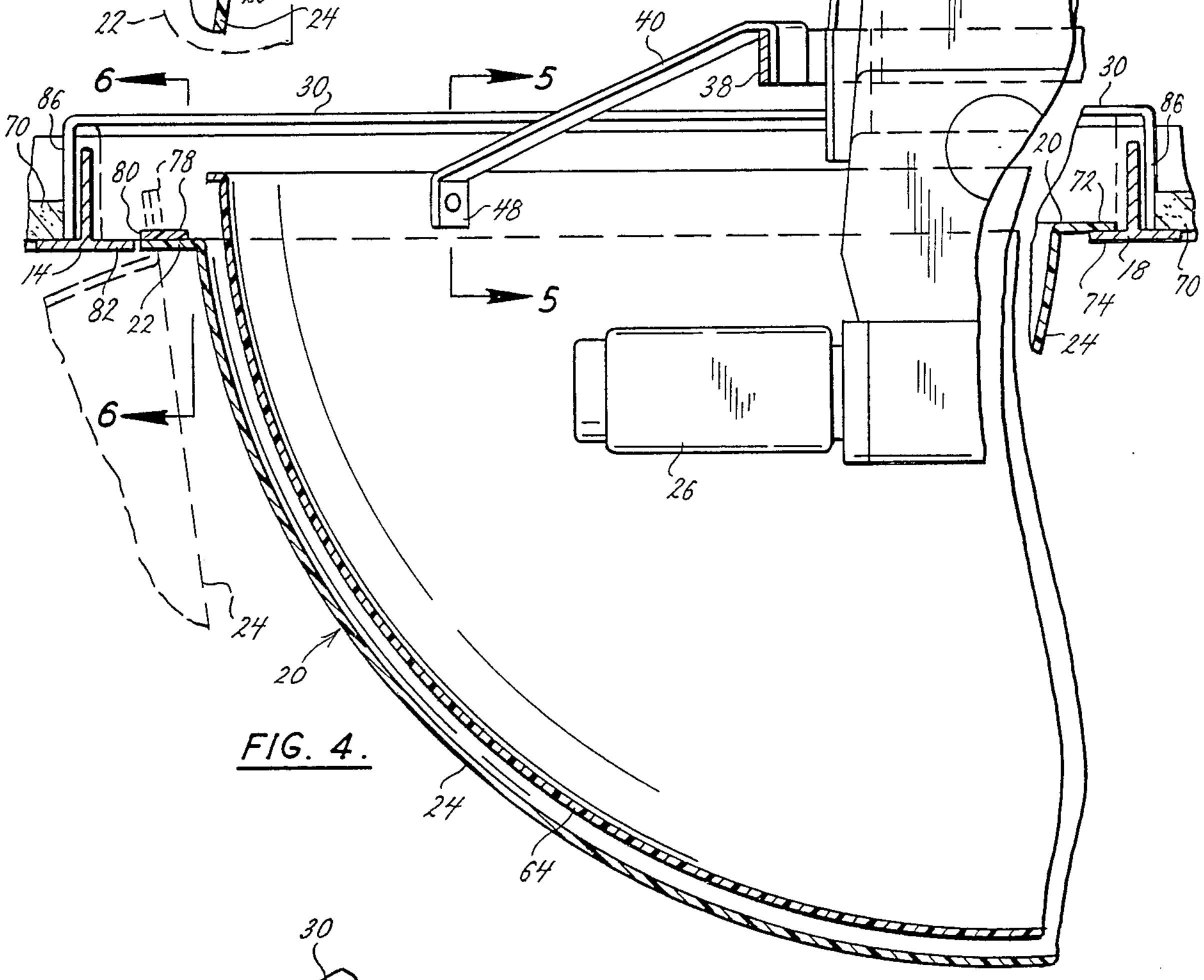
FIG. 4.
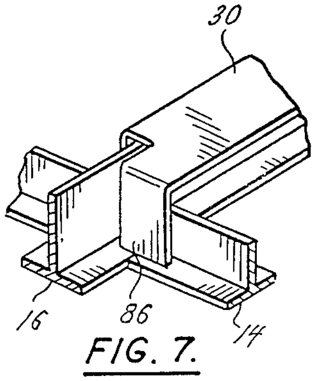
FIG. 7.
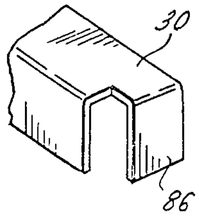
FIG. 8.

SURVEILLANCE HOUSING ASSEMBLY

BACKGROUND OF THE INVENTION

I. Field of the Invention

The present invention relates generally to an in-ceiling mounting of monitoring cameras of the type to observe persons within a predetermined monitored area. More particularly, the present invention relates to an improved arrangement for mounting such monitoring cameras as a part of a suspended ceiling, wherein the camera is enclosed, and if desired, so as to be obscured from the persons being observed but readily accessible from below when such access is required.

II. Prior Art

It is not uncommon, particularly in places of business, to use suspended ceilings. Such ceilings include a rectangular forming framework of inverted T-shaped strip members that are hung from a structural ceiling by wires, hangers, or the like. In U.S. Pat. No. 4,160,999 there is disclosed a mounting arrangement for a monitoring camera which is installed as a normal ceiling panel. Unfortunately, such an arrangement lacks stability against lateral movement and the arrangement itself must also be hung from the structural ceilings by wires or hangers. There is a need for an improved arrangement, wherein no ceiling suspension of the mounting arrangement is required and wherein such arrangement is supported solely by the T-shaped strips. Additionally, the arrangement of the present invention can conveniently be dropped in place and suspended only by strip members without the need of means for independently supporting the arrangement from the ceiling and can be removed without the need of detatching the arrangement from its own independent ceiling support.

SUMMARY OF THE INVENTION

In accordance with the present invention, there is provided a surveillance camera housing assembly suitable for mounting in a sturdy arrangement as part of a suspended ceiling. The mounting provides quick and convenient access to the camera from below the ceiling through a viewing housing of the camera which may be partially opaque, if desired, to obscure the presence of the camera from those persons being observed. Side support members of the mounting assembly are provided that extend over the upwardly extending stems of cross-forming inverted T-shaped ceiling support members and have portions that project downwardly and rest on the outer edges of the cross-forming T members. Between the side support members is a bridge which is offset upwardly. A surveillance camera device is mounted from the bottom and depends from of the bridge in a generally downward direction. A spider assembly is mounted to the camera device. The camera assembly may be motorized or nonmotorized depending on whether the area to be monitored is to be scanned or only a particular area is to be observed.

An inner dome of a preselected transparency is suspended from the spider assembly, whose outer ends are provided with outwardly projecting pins for snap-on engagement with corresponding holes provided circumferentially near the top of the inner dome. An outer dome having a rectangular base approximating in area the rectangular area provided by the inverted cross-forming T-shaped members is provided. Ears extend outwardly along one end of the outer dome for engagement with the inner edges of spaced apart parallel arranged T-shaped members such that when the outer dome is laterally shifted, the outer dome can be pivoted downwardly along the horizontal axis of the end provided with the ears while being suspended by the T-shaped members. The camera assembly is conveniently installed by placing the assembly downwardly over the open rectangular ceiling panel formed by the crossing of two pairs of T-shaped members. Thereafter, the outer dome is simply lifted upwardly above the inner edges of the T members and thus aligned so that the ears of the outer dome rest on the corresponding inner edges of the parallel T-shaped members. The outer dome then is horizontally adjusted to provide for suitable suspension thereof. The inner dome may be mounted to the spider either before or after the mounting assembly is placed over the rectangular ceiling opening provided by the four crossed T-shaped members. Thus, when access to the camera is needed, the outer dome is slid horizontally so that the outer dome may pivot downwardly along an axis of the eared edge of the dome and thus remains in a suspended position. The inner dome is made of a suitably pliant substance such that one can remove the same by slightly temporarily distorting the dome to provide for disengagement of the pins of the spider from the corresponding holes of the inner dome.

BRIEF DESCRIPTION OF THE DRAWING

FIG. 4 is an enlarged view, partially in cross-section, taken on line 4—4 in FIG. 2.

FIG. 5 is a cross-sectional view taken on line 5—5 in FIG. 4 showing one of a plurality of snap-on arrangements of the inner surveillance housing to the support members.

FIG. 6 is a cross-sectional view taken along line 6—6 in FIG. 4.

FIG. 7 is a perspective view showing the resting engagement with the side support of the mounting assembly of the present invention with the edges of cross-forming T-shaped ceiling suspension members.

FIG. 8 is a perspective view showing a end of a side support of the mounting assembly adapted for overlapping the upright stems of an inverted T-shaped ceiling suspension member and being supported by the edges of cross-forming T-shaped members.

DESCRIPTION OF THE PREFERRED EMBODIMENT

Figure 1:
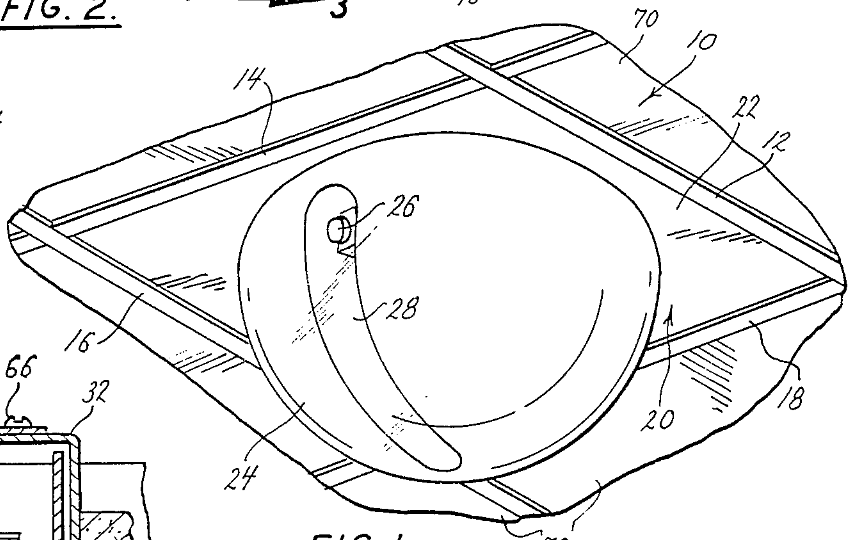
FIG. 1 is a perspective view looking up at a suspended ceiling wherein the surveillance camera housing assembly of the present invention is positioned into one of the rectangular sections of such ceiling.

With reference now to the drawing and in particular to FIG. 1, numeral 10 generally denotes a suspended ceiling. Such a ceiling includes a rectangular network of cross-forming inverted T-shaped strip members 12, 14, 16, and 18 which define at least one rectangular opening. Ceiling panels of suitable size and lightweight composition are simply dropped into the rectangular openings defined by the strip members and are suspended by the horizontally extending edges of the strip members.

As shown in FIG. 1 the surveillance camera housing assembly of the present invention is suspended within one of such rectangular openings and includes a viewing panel 20 which may be a single piece of suitable size and shape to occupy one complete ceiling opening and which has a flat rectangular base portion 22 and being provided with a hemispherical outer dome 24 of desired transparency or opaqueness. As shown, a camera 26, such as one adapted for closed circuit television, may be obscured or partially obscured from the view of the person being observed except for a small viewing section 28 of reduced size.

Figure 2:
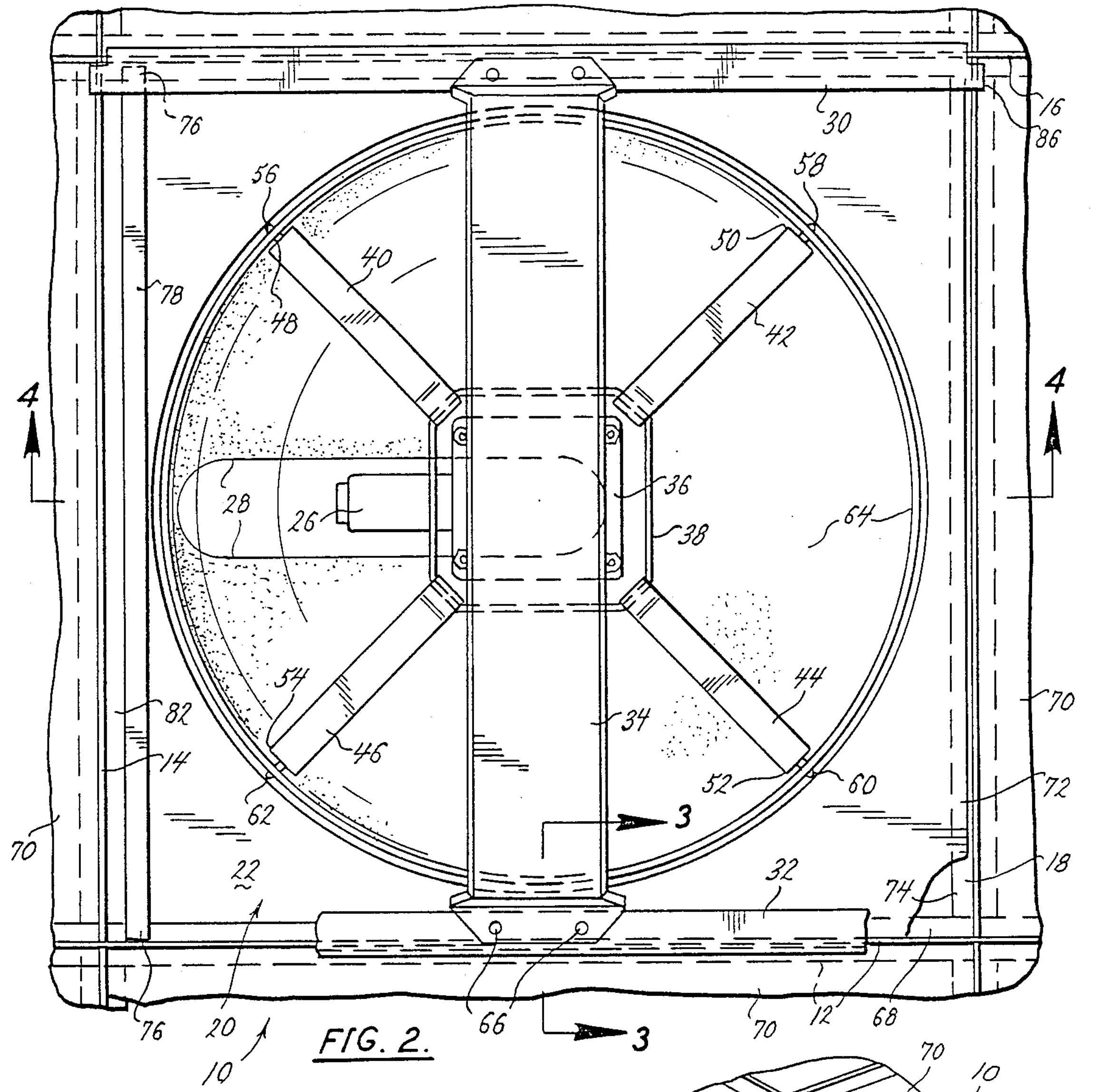
FIG. 2 is an enlarged top view looking downwardly on the assembly from above the suspended ceiling but below the structural ceiling.

With reference now to FIG. 2 strip members 12, 14, 16, and 18 are crossed to form a square opening. Members 12 and 16 can be hung by wires or hangers not shown from the structural ceiling of a building. Any conventional means for hanging a drop ceiling may be used. Members 14 and 18 are suitably interlocked with members 12 and 16 to provide a rectangular opening. The mounting assembly of the present invention includes a pair of parallel disposed spaced apart support members 30 and 32.

An upwardly extending bridge 34 spans support members 30 and 32 and are secured together therewith to form a rigid structure. Depending downwardly from the bridge is a motor mounting assembly 36 which supports a frame 38 having a plurality of radiating legs 40, 42, 44, and 46. The distal ends 48, 50, 52, and 54 of the legs have downwardly extending ends which are each provided with outwardly projecting securing pins 56, 58, 60 and 62.

An inner dome 64 of suitable pliancy is provided with a plurality of circumferentially disposed holes near its base. As shown, the pins engage these holes to support the inner dome in quick detatchable relationship.

Figure 3:
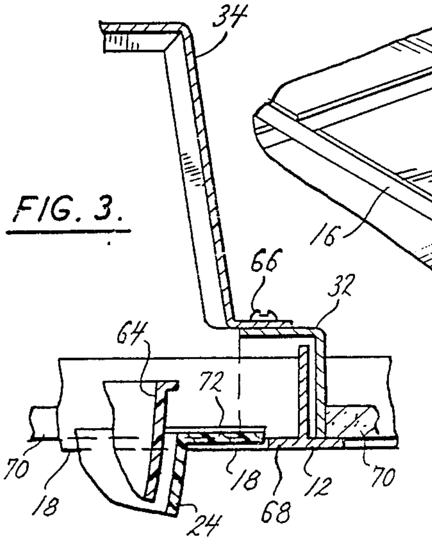
FIG. 3 is a cross-sectional view taken on line 3—3 in FIG. 2.

With reference now to FIG. 3 it is seen that support member 32 has an inverted L-shape cross-section and is joined in rigid supporting relationship with bridge 34 by bolt means 66. Member 32 rests along the outer edge 68 of strip member 18. Ceiling tile 70 spans an adjacent rectangular ceiling section in a conventional manner. Base portion 22 is provided with a lip portion 72 that normally rests on the inside edge 74 of strip member 18. The outer dome may be shifted slightly upwardly and to the right as illustrated in FIG. 3 so that lip portion 72 securely rests on edge 74.

As can be more clearly seen in FIG. 6, panel 20 is provided with ears 76 that extend therefrom and rest on the inside edges of strips 14 and 18. Edge 80 normally rests on or abuts the inside edge 82 of strip 16. To obtain access to camera 26 panel 20 may be slightly raised and slid to the left as illustrated in FIG. 4 so that lip portion 72 clears the edge 74 of strip 12. This permits outer dome 24 to be pivotted out of the way as illustrated by the broken lines as shown on the left side of FIG. 4. Along the edge of panel 20 a narrow reinforcing strip 78 may be affixed to provide the ears. The ears may be the ends of a narrow strip affixed to an outer edge of the panel 20 and having a length slightly longer than the length of the edge of the panel to provide a small projecting overhang at each end of the edge.

In FIG. 5 the supporting engagement of inner dome 64 by leg 40 is shown. Leg 40 has downwardly extending end 48 which is provided with an outwardly projecting pin 62 which extends through hole 84 in the upper portion of inner dome 64. The dome is preferably made of pliant material such that upon slight compression of the dome the engagement of each of the pins into each of their corresponding holes can be conveniently withdrawn.

As can be seen in FIG. 6, support member 30 rests on the outer edge of strip member 14. Ear 76 is supported on the inner edge of strip member 14 so that the outer dome 24 may be let down from one end and be supported on the other end by the ears being supported on the inside edges of parallel strip numbers 14 and 18.

In FIG. 7 support member 30 rests on the outer edge of strip member number 14 and is provided with a downwardly projecting finger 86 which is supported on the inner edge of strip 14 and the outer edge of strip member 16. Each of the four ends of support members 30 and 32 is provided with similar fingers which rest on the intersecting strip members in similar fashion. By such an arrangement the surveillance camera housing assembly is restrained from any substantial lateral movement.

The construction of finger 86 is more conveniently illustrated in FIG. 8.

There are various changes and modifications which may be made to the invention as would be apparant to those skilled in the art. However, these changes or modifications are included in the teaching of inventor's disclosure; and it is intended that the invention be limited only by the scope of the following claims.

What is claimed is:

1. In a surveillance camera housing assembly mounted as a suspended ceiling portion formed by cross-forming inverted T-shaped ceiling supporing members the improvement wherein the assembly includes a dome of preselected transparency with a base approximately the size of its said ceiling portion with one edge of said dome being provided with a horizantally extending edge for suspending the same between two parallel disposed spaced apart inverted T-shaped members as the dome is pivoted downwardly about the horziontal axis of the eared edge of the dome.

2. A surveillance camera housing assembly for mounting as a suspended ceiling portion formed by cross-forming inverted T-shaped ceiling supporting members comprising;

- a pair of generally parallel spaced apart support members;
- a bridge spanning the support members to form a generally rigid structure therewith;
- a surveillance camera mounting depending downwardly from the bridge;
- a frame with a plurality of radiating legs attached to said camera mounting;
- an inner dome with preselected transparency and pliancy, said inner dome and the legs of the frame being engaged in quick detatchable relationship;
- an outer dome of preselected transparency and pliancy with a base approximating the size of the said ceiling portion; and
- one edge of the outer dome being provided with a horizontally extending edge for suspending the same between two parallel disposed spaced apart inverted T-shaped members as the outer dome is pivoted downwardly about the horizontal axis of the eared edge of the outerdome.

3. The surveillance camera housing assembly of claim 2, wherein the support members have an inverted L-shaped cross-section adapted to extend over and to rest longitudinally on each of the outer edges of a first pair of parallel disposed ceiling suspending members.

4. The surveillance camera housing assembly of claim 3 wherein each end of both support members is provided with a downwardly projecting finger that extend over the upwardly projecting stem and to rest on each of the outer edges of a second pair of parallel disposed ceiling suspending members.

5. The surveillance camera housing assembly of claim 4 wherein the legs of the frame have ends with outwardly projecting pins.

6. The surveillance camera housing assembly of claim 5 wherein the inner dome is provided with a plurality of circumferentially disposed holes near the top of the dome for quick detatchable arrangement with the pins of the legs of the frame.

7. The surveillance camera housing assembly of claim 6 wherein the ears are provided by a strip attached along one edge of the outer dome and having a length slightly longer than the length of the edge.

8. The surveillance camera housing assembly of claim 2 wherein the camera assembly is motorized.

9. The surveillance camera housing assembly of claim 2 wherein the camera is a closed circuit television monitoring device.

10. The surveillance camera housing assembly of claim 2 wherein the edges of the inverted T-shaped members provide the sole support of the assembly.

* * * * *